United States Patent
Robert Jose et al.

(10) Patent No.: US 12,380,141 B2
(45) Date of Patent: *Aug. 5, 2025

(54) SYSTEMS AND METHODS FOR IDENTIFYING DYNAMIC TYPES IN VOICE QUERIES

(71) Applicant: Adeia Guides Inc., San Jose, CA (US)

(72) Inventors: Jeffry Copps Robert Jose, Tamil Nadu (IN); Manik Malhotra, Durham, NC (US)

(73) Assignee: Adeia Guides Inc., San Jose, CA (US)

( * ) Notice: Subject to any disclaimer, the term of this patent is extended or adjusted under 35 U.S.C. 154(b) by 919 days.

This patent is subject to a terminal disclaimer.

(21) Appl. No.: 17/520,142

(22) Filed: Nov. 5, 2021

(65) Prior Publication Data

US 2022/0058213 A1 Feb. 24, 2022

Related U.S. Application Data

(63) Continuation of application No. 16/518,840, filed on Jul. 22, 2019, now Pat. No. 11,200,264.

(51) Int. Cl.
*G06F 16/00* (2019.01)
*G06F 16/3329* (2025.01)
(Continued)

(52) U.S. Cl.
CPC ........ *G06F 16/3329* (2019.01); *G06F 16/383* (2019.01); *G06F 16/634* (2019.01); *G06F 40/295* (2020.01); *G10L 21/06* (2013.01)

(58) Field of Classification Search
CPC ... G10L 15/26; G10L 2015/088; G10L 15/08; G10L 25/03; G10L 15/1822; G10L 13/00;
(Continued)

(56) References Cited

U.S. PATENT DOCUMENTS 7,220,910 B2 * 5/2007 Plastina .............. G06F 16/4387
369/30.08
9,460,722 B2 10/2016 Sidi et al.
(Continued)

OTHER PUBLICATIONS

Shin-Mu Tseng, "Efficient mining of categorized association rules in large databases," Smc 2000 conference proceedings. 2000 ieee international conference on systems, man and cybernetics. Nashville, TN, USA, 2000, pp. 3606-3610 vol. 5 (Year: 2000).*

(Continued)

*Primary Examiner* — Edgar X Guerra-Erazo
(74) *Attorney, Agent, or Firm* — HALEY GUILIANO LLP

(57) ABSTRACT

The system receives a voice query at an audio interface and converts the voice query to text. The system identifies entities included in the query based on comparison to an information graph, as well as dynamic types based on the structure and format of the query. The system can determine dynamic types by analyzing parts of speech, articles, parts of speech combinations, parts of speech order, influential features, and comparisons of these aspects to references. The system combines tags associated with the identified entities and tags associated with the dynamic types to generate query interpretations. The system compares the interpretations to reference templates, and selects among the query interpretations using predetermined criteria. A search query is generated based on the selected interpretation. The system retrieves content or associated identifiers, updates metadata, updates reference information, or a combination thereof. Accordingly, the system responds to queries that include non-static types.

20 Claims, 7 Drawing Sheets

(51) Int. Cl.
*G06F 16/383* (2019.01)
*G06F 16/632* (2019.01)
*G06F 40/295* (2020.01)
*G10L 21/06* (2013.01)

(58) Field of Classification Search
CPC ....... G10L 15/18; G06N 5/02; G06F 16/9535; G06F 16/68; G06F 16/243; G06F 16/3329; G06F 16/334; G06F 40/30; G06F 40/289; G06F 40/169; G06F 40/211; G06F 40/279; G06F 40/56
See application file for complete search history.

(56) References Cited

U.S. PATENT DOCUMENTS

| | | | |
|---|---|---|---|
| 9,881,617 B2 | 1/2018 | Sidi et al. | |
| 10,056,078 B1 | 8/2018 | Shepherd et al. | |
| 10,109,280 B2 | 10/2018 | Sidi et al. | |
| 11,200,264 B2* | 12/2021 | Robert Jose | G06F 16/9535 |
| 2003/0154072 A1 | 8/2003 | Young et al. | |
| 2006/0074928 A1* | 4/2006 | MacLaurin | G06F 3/0481 |
| 2006/0080288 A1* | 4/2006 | MacLaurin | G06F 16/10 |
| 2007/0083374 A1 | 4/2007 | Bates et al. | |
| 2015/0025887 A1 | 1/2015 | Sidi et al. | |
| 2017/0053653 A1 | 2/2017 | Sidi et al. | |
| 2018/0158464 A1 | 6/2018 | Sidi et al. | |
| 2021/0026878 A1 | 1/2021 | Robert Jose et al. | |

OTHER PUBLICATIONS

Bouramoul, Abdelkrim, Mohamed-Khireddine Kholladi, and Bich-Lien Doan. "PRESY: A Context based query reformulation tool for information retrieval on the Web." arXiv preprint arXiv:1106.2289 (2011). (Year: 2011).*

PCT International Search Report for International Application No. PCT/US2020/042087, dated Sep. 28, 2020 (14 pages).

* cited by examiner

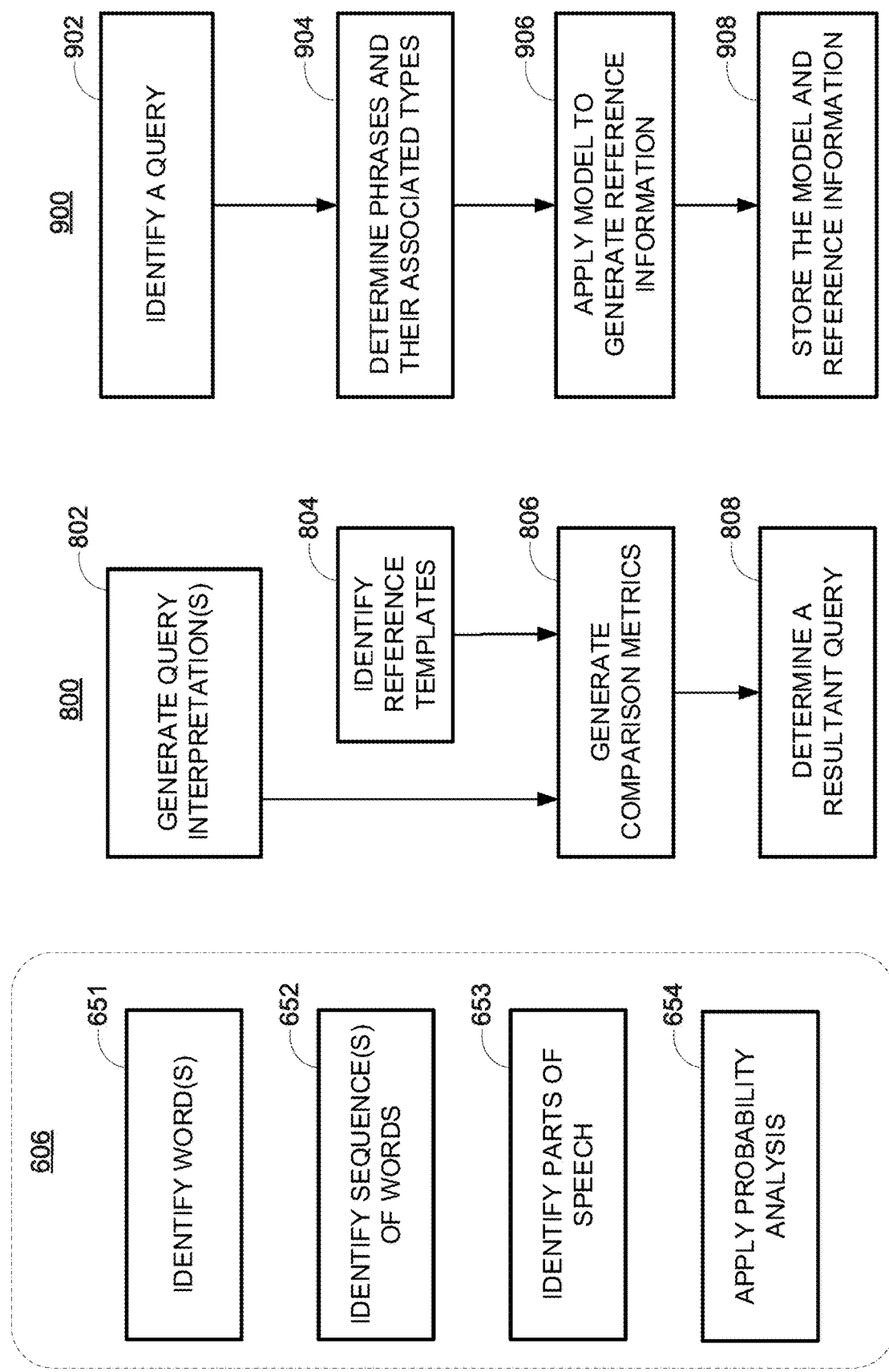

SYSTEMS AND METHODS FOR IDENTIFYING DYNAMIC TYPES IN VOICE QUERIES

CROSS-REFERENCE TO RELATED APPLICATION

This application is a continuation of U.S. patent application Ser. No. 16/518,840, filed Jul. 22, 2019, the contents of which is hereby incorporated by reference herein in its entirety.

BACKGROUND

The present disclosure relates to systems for managing voice queries, and, more particularly, systems for identifying dynamic types in voice queries.

SUMMARY

In a conversation system, when a user fires a voice query to the system, the speech is converted to text using an Automatic Speech Recognition (ASR) module. This text then forms the input to a conversation system, which determines a response to the text. Sometimes in this process, the user's query includes words or phrases that are not existing types or otherwise stored categorizations (e.g., static information). For example, a user may search for content that is not present in a data/knowledge graph. The user will not be able to locate the required content through voice commands and queries, but only through using a remote or predetermined set of clicks (e.g., typing information exactly as stored in the data graph). This dynamic information must be interpreted in response to the query (e.g., in real time), rather than predetermined in a database. Detecting dynamic types in queries helps the system to more accurately respond to the user's query.

The present disclosure describes systems and methods that perform a search based on multiple analyses to predict a user's intended search query. The search may be based on multiple contextual inputs that include, for example, entities identified in the query, dynamic types associated with the query, user search history, user likes and dislikes, general trends, and any other suitable information. The system receives a voice query and generates a text query that is representative of the voice query. The system detects dynamic types of the query, if present, and, along with identifying entities and context information, generates a resulting set of tags. The dynamic types are identified based on sequences, words, and patterns of the query. The system generates prospective interpretations of the query based on the resulting set of tags, and selects among those prospects to determine one or more interpretations to use for searching. Accordingly, the system not only identifies entities that are included in a query, but also likely dynamic types included in the query.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 7 shows further illustrative steps of the process of FIG. 6 for generating tags based on a dynamic type, in accordance with some embodiments of the present disclosure;

FIG. 8 shows a flowchart of an illustrative process for generating a resulting query, in accordance with some embodiments of the present disclosure; and FIG. 9 shows a flowchart of an illustrative process for training a system for detecting dynamic types, in accordance with some embodiments of the present disclosure.

DETAILED DESCRIPTION

Figure 1:
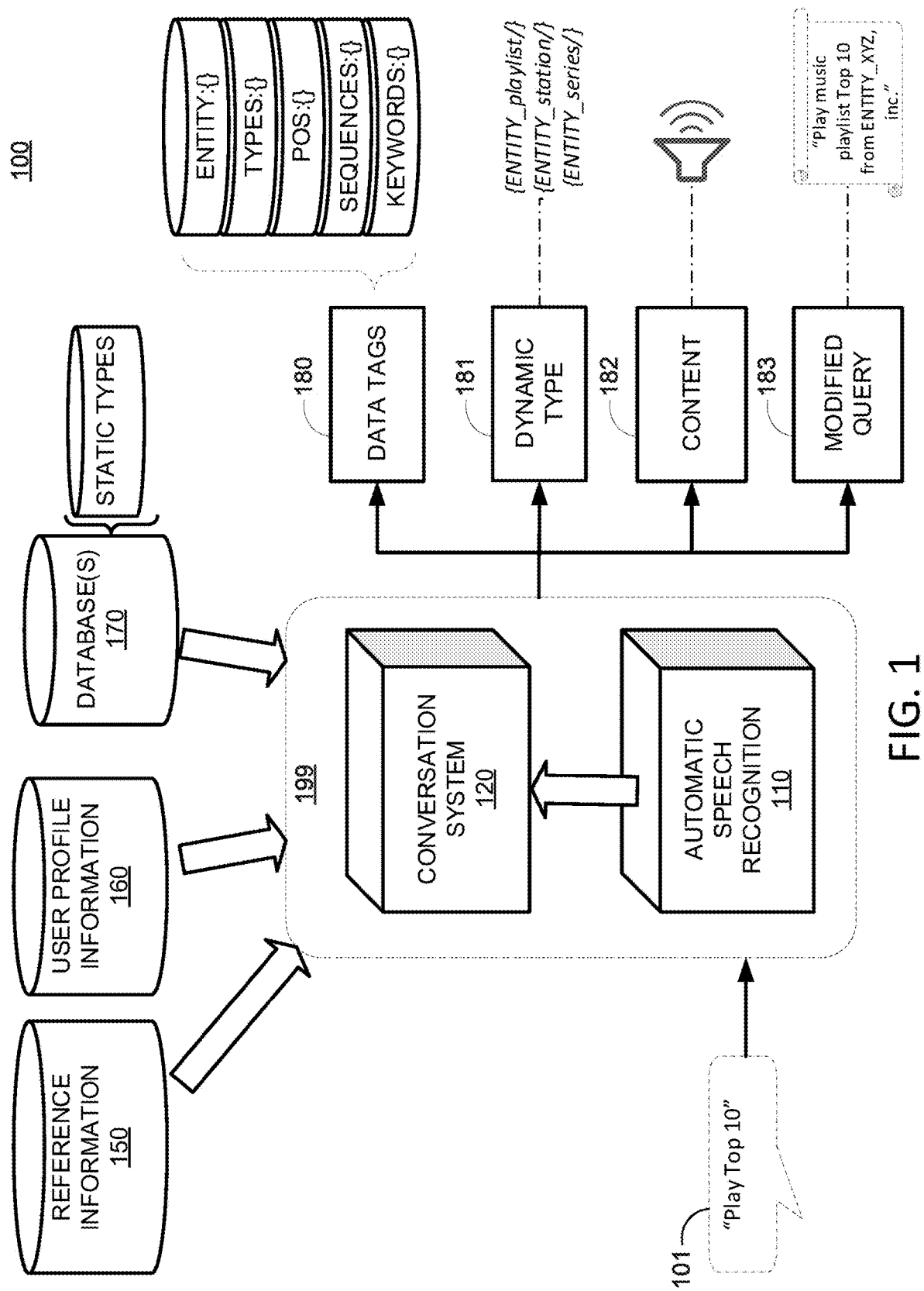
FIG. 1 shows a block diagram of an illustrative system for responding to a query, in accordance with some embodiments of the present disclosure.

FIG. 1 shows a block diagram of illustrative system 100 for responding to a query, in accordance with some embodiments of the present disclosure. System 100 includes ASR module 110, conversation system 120, reference information 150, user profile information 160 and one or more databases 170. For example, ASR module 110 and conversation system 120, which together may be included in system 199, may be used to implement a query application. In some embodiments, system 199 may communicate with, or otherwise interact with, a search system (e.g., by transmitting modified query 183). For example, conversation system 120 may include natural language understanding (NLU) analytics to identify and parse text. In a further example, conversation system 120 may be configured to detect dynamic types (i.e., dynamic categorizations) for queries through segmentation (i.e., type recognition), without a gazetteer or other predetermined categorization. In a further example, conversation system 120 may use conditional random fields (CRF) analysis to identify and tag text of a query based on sequences within the query.

A user may voice query 101 which includes speech "Play Top 10" to an audio interface of system 199. ASR module 110 is configured to sample, condition, and digitize the received audio input and analyze the resulting audio file to generate a text query. In some embodiments, ASR module 110 retrieves information from user profile information 160 to help generate the text query. For example, voice recognition information for the user may be stored in user profile information 160, and ASR module 110 may use voice recognition information to identify the speaking user. In some embodiments, conversation system 120 is configured to generate the text query, respond to the text query, or both, based on the recognized words from ASR module 110, contextual information, user profile information 160, reference information 150, one or more databases 170, any other information, or any combination thereof. For example, conversation system 120 may generate a text query and then compare the text query with metadata associated with a plurality of entities to determine a match. In a further example, conversation system 120 may compare one or more recognized words, parts of speech, articles, or other aspects of the text query to reference information 150 to detect dynamic types. In some embodiments, conversation system 120 generates a string of text from the voice query, and analyzes the string of text to generate a text query. In a further example, reference information 150 may include one or more reference templates with which the text query may be compared to identify types, format, or otherwise help in generating a query. System 199 may generate, modify, or otherwise manage data tags 180 based on analyzing the text. For example, system 199 may store data tags corresponding to one or more identified dynamic types for use in further searches, or as part of a training set (e.g., to train a search algorithm). Data tags 180 may include any suitable type of tags associated with an entity, static type, dynamic type, part of speech or sequence thereof, keyword or sequence thereof, sequence or pattern of features, or any other feature of the query (e.g., query 101). In some embodiments, each tag is associated with a word or phrase of the query (e.g., query 101). System 199 may identify and output dynamic type 181 to a search engine, display device, memory storage, or other suitable output for further processing, storage, or both. System 199 may identify and retrieve content 182 (e.g., stored in one or more databases 170), or identifiers thereof, based on a text query and search operation of one or more databases 170. For example, system 199 may retrieve a music or video playlist, a video for display, a music item for display, or any other suitable content item.

User profile information 160 may include user identification information (e.g., name, an identifier, address, contact information), user search history (e.g., previous voice queries, previous text queries, previous search results, feedback on previous search results or queries), user preferences (e.g., search settings, favorite entities, keywords included in more than one query), user likes/dislikes (e.g., entities followed by a user in a social media application, user-inputted information), other users connected to the user (e.g., friends, family members, contacts in a social networking application, contacts stored in a user device), user voice data (e.g., audio samples, signatures, speech patterns, or files for identifying the user's voice), any other suitable information about a user, or any combination thereof.

One or more databases 170 include any suitable information for generating a text query, responding to a text query, or both. In some embodiments, reference information 150, user profile information 160, or both may be included in one or more databases 170. In some embodiments, one or more databases 170 include statistical information for a plurality of users (e.g., search histories, content consumption histories, consumption patterns), a plurality of entities (e.g., content associated with entities, metadata, static types), or both. For example, one or more databases 170 may include information about a plurality of entities including persons, places, objects, events, content items, media content associated with one or more entities, or a combination thereof, and any categorizations thereof.

In an illustrative example, a user may fire a voice query at system 199 such as "Play top 10 playlist," "Play viral 50 Chart," or "Play happy holidays station." System 199 generates categories or sub-categories (e.g., playlists, stations) at run time (e.g., in response to the query and not predetermined) based on several factors or inferences of an analytics platform of conversation system 120. This categorization is subject to being volatile, and dependent upon user speech and word choice (e.g., these categorizations are not universal among users). For example, these playlists may be created, modified, or deleted over a period of time and hence are not published, synchronized, or otherwise stored to a searchable index (e.g., in the context of an NLU system). To illustrate, playlists may be created per user and thus the number of playlists can be very high. Further, in the context of music stations, the NLU system (e.g., conversation system 120) may be configured to work with several music content providers, some of which might not publish their searchable meta content, thus making it difficult or even impossible to combine stations from all of the content sources.

In some embodiments, conversation system 120 assigns artificial tags to phrases. Artificial tags are associated with types that are not obtained from entity recognition (e.g., which tags only what is available in the data graph) using segmentation. For example, conversation system 120 may tag queries such as "New Music Friday" or "Viral 50 chart" as ENTITY_playlist/ or any other distinct type, and in turn use that tag to generate an interpretation of the query. Identifying the type as a playlist, for example, helps the system respond to the phrase "New Music Friday" by providing a playlist, as suggested by the system, to the user which uses the phrase to launch an audio streaming service provider, having this query in its search parameters. These types of queries can be fired and responded to without advance knowledge about the existence of playlists, charts, or stations.

Figure 2:
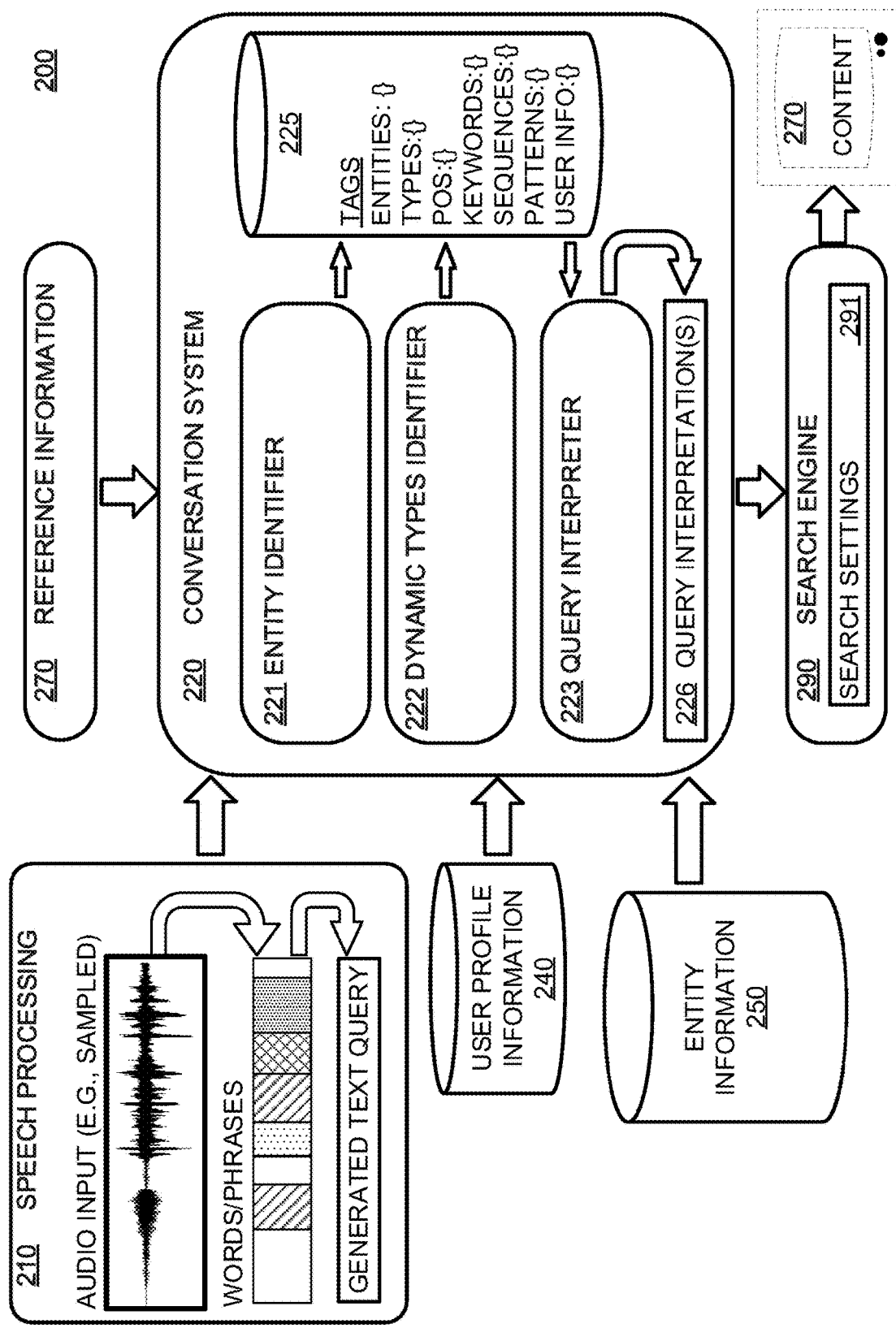
FIG. 2 shows a block diagram of an illustrative system for retrieving content in response to a voice query having a dynamic type, in accordance with some embodiments of the present disclosure.

FIG. 2 shows a block diagram of illustrative system 200 for retrieving content in response to a voice query having a dynamic type, in accordance with some embodiments of the present disclosure. As illustrated, system 200 includes speech processing system 210, conversation system 220, search engine 290, entity information 250, user profile information 240, and reference information 270. For example, a user may fire a voice query at speech processing system 210, which provides a string of text to conversation system 220. Conversation system 220 identifies one or more entities in the string of text (e.g., using entity identifier 221), identifies one or more dynamic types of the string of text (e.g., using dynamic types identifier 222), interprets the string of text as a query (e.g., using query interpreter 223), or a combination thereof. Conversation system 220 may also retrieve data from reference information 270, user profile information 240, and entity information 250.

Speech processing system 210 may identify an audio file and may analyze the audio file for phonemes, patterns, words, or other elements from which keywords may be identified. In some embodiments, speech processing system 210 may analyze an audio input in the time domain, spectral domain, or both to identify words. For example, speech processing system 210 may analyze the audio input in the time domain to determine periods of time during which speech occurs (e.g., to eliminate pauses or periods of silence). Speech processing system 210 may then analyze each period of time in the spectral domain to identify phonemes, patterns, words, or other elements from which keywords may be identified. Speech processing system 210 may output a generated text query, one or more words, or a combination thereof. In some embodiments, speech processing system 210 may retrieve data from user profile information 240 for voice recognition, speech recognition, or both.

Conversation system 220 receives the output from speech processing system 210, and generates a text query (e.g., to provide to search engine 290). In some embodiments, conversation system 220 may include search engine 290. Search engine 220 may use user profile information 240 to generate, modify, or interpret a text query or string of text. Entity information 250 may include a data graph and metadata associated with a plurality of entities, content associated with the plurality of entities, or both. For example, data may include an identifier for an entity, details describing an entity, a title referring to the entity, phrases associated with the entity, links (e.g., IP addresses, URLs, hardware addresses) associated with the entity, keywords associated with the entity (e.g., tags or other keywords), any other suitable information associated with an entity, or any combination thereof. In some embodiments, conversation system 220 generates tags or other suitable metadata for storage. For example, as conversation system 220 responds to increasing numbers of queries, the set of information may be used to inform further query responses (e.g., using machine learning, data analysis techniques, statistics).

Entity identifier 221 of conversation system 220 identifies one or more entities of the text query. In some embodiments, entity identifier 221 compares words of the query against tags associated with nodes of the information graph to identify one or more entities. In some embodiments, conversation system 220 may determine context information based on an identified entity (e.g., genre information to further narrow the search field), keywords, database identification (e.g., which database likely includes the target information or content), types of content (e.g., by date, genre, title, format), any other suitable information, or any combination thereof.

Dynamic types identifier 222 of conversation system 220 identifies one or more dynamic types of the text (e.g., text provided by speech processing system 210). In some embodiments, dynamic types identifier 222 identifies sequences of words, parts of speech and sequences thereof, influential features (e.g., keywords or explicit references to a known dynamic type), any other suitable features, or any combination thereof. For example, dynamic types identifier 222 need not identify entities, but rather the structure (e.g., sequences and patterns) of the query that match predetermined criteria with some probability. In some embodiments, dynamic types identifier 222 identifies a plurality of sequence labels (e.g., groups of words and their sequence) and uses a model to identify a plurality of associated dynamic types. A probability, confidence, or metric derived thereof, may be determined to identify dynamic types for which tags are generated (e.g., and are ultimately used to generate a search query for search engine 290).

In an illustrative example, entity identifier 221 and dynamic types identifier 222 may output tags 225, which may be received as input by query interpreter 223. Tags 225 may include any suitable types of tags that may be associated with entities (e.g., names, places, occupations, things, attributes); types (e.g., static or dynamic); parts of speech (e.g., accordingly to any suitable reference and may include noun, pronoun, verb, adjective, adverb, determiner, article, preposition, conjunction, interjection, digit, proper noun, compounds, contractions); keywords (e.g., influential features that are not necessarily entities); sequences (e.g., of words, parts of speech, or phrases); patterns (e.g., of words, parts of speech, or phrases); user information; any other information or features; or any combination thereof. Tags of tags 225 may include text (e.g., letters, words, strings of words, symbols, or combinations thereof), numerical values, or any combinations thereof (e.g., alphanumeric identifiers).

Query interpreter 223 takes as input tags 225 associated with the identified dynamic types of dynamic types identifier 222 and the tags of entity identifier 221 to generate one or more query interpretations 226. A query interpretation is an illustrative search query that may be derived from the set of tags 225. In some embodiments, query interpreter 223 compares each query interpretation against a plurality of reference templates (e.g., of reference information 270) to determine which query interpretations have the highest probability of being associated with the text query from speech processing system 210. Query interpreter 223 may use any suitable fuzzy math, artificial intelligence, statistical, or informatic technique to generate a short list of one or more query interpretations to provide to search engine 290. In some embodiments, conversation system 220 provides one or more queries to search engine 290 to retrieve a plurality of search results, which may be parsed or filtered in any suitable way.

In an illustrative example, each query interpretation may include parts of speech, an order (e.g., a sequence), and other features. The reference templates may each include a respective set of features that correspond to the template. For example, a first template may include a reference sequence "verb-article-adjective-digit" having a confidence of 0.90, and reference keywords "play," "tune," "hear" having a confidence of 0.91 for the verb of the sequence. The first template may be associated with searching for playlists among music content sources. If a query interpretation matches the reference sequence and the reference verbs, query interpreter 223 may select that query interpretation for forwarding to search engine 290. For example, query interpreter 223 may determine a composite confidence based on the confidence values (e.g., 0.9 and 0.91 in this example). Query interpreter 223 may determine a composite confidence for each query interpretations, and those that have a confidence above a threshold, or the high confidence value or values, may be selected as query interpretations 226.

Search engine 290 receives output from conversation system 220, and, in combination with search settings 291, generates a response to a text query. Search engine 290 may use user profile information 240 to generate, modify, or respond to a text query. Search engine 290 searches among data of entity information 250 using the text query. Entity information 250 may include metadata associated with a plurality of entities, content associated with the plurality of entities, or both. For example, data may include an identifier for an entity, details describing an entity, a title referring to the entity, phrases associated with the entity, links (e.g., IP addresses, URLs, hardware addresses) associated with the entity, keywords associated with the entity, any other suitable information associated with an entity, or any combination thereof. When search engine 290 identifies one or more entities or content items that match keywords of the text query, or both, search engine 290 may then provide information, content, or both to the user as response 270 to the text query. In some embodiments, search settings 291 include which databases, entities, types of entities, types of content, other search criteria, or any combination thereof to affect the generation of the text query, the retrieval of the search results, or both. In some embodiments, search engine 290 may use genre information (e.g., to further narrow the search field); keywords; database identification (e.g., which database likely includes the target information or content); types of content (e.g., by date, genre, title, format); any other suitable information; or any combination thereof. Response 270 may include, for example, content (e.g., a displayed video, a played audio file), information, a listing of search results, links to content, any other suitable search results, or any combination thereof.

Figure 3:
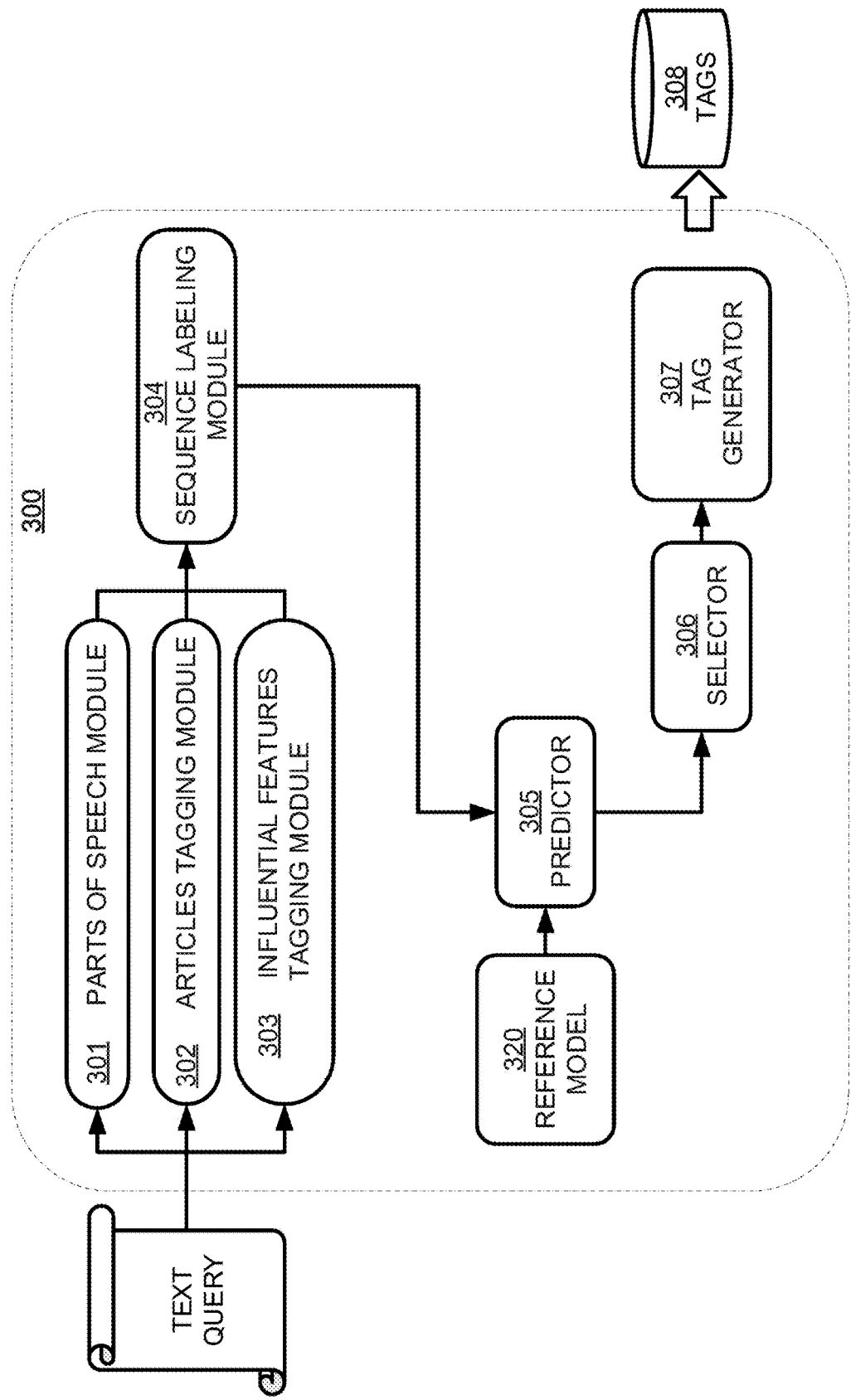
FIG. 3 shows a block diagram of an illustrative system for generating tags from dynamic types, in accordance with some embodiments of the present disclosure.

FIG. 3 shows a block diagram of illustrative system 300 for generating tags from dynamic types, in accordance with some embodiments of the present disclosure. As illustrated, system 300 includes parts of speech (POS) module 301, articles tagging module 302, influential features tagging module 303, sequence labeling module 304, predictor 305, selector 306, and tag generator 307. For example, system 300 receives as input a text query or string of text and provides as output one or more tags indicative of at least one dynamic type. In some embodiments, system 300 may be similar to, or included as part of, dynamic types identifier 222 of FIG. 2.

POS module 301 is configured to identify and tag parts of speech in a string of text. For example, a string of text may include a sequence of parts of speech of "noun, verb, noun, noun". POS module 301 may search among reference information to identify a query template that includes the same order. The query template is then used to tag the text. The query template may be trained using training data to recognize the sequence, or the sequence may be predetermined and stored. For example, POS module 301 may identify a sequence of parts of speech, compare the sequence against known query types, and identify the query type that most closely matches. POS module 301 may tag parts of speech of the text based on historical information (e.g., from previous analysis), based on one or more criteria or rules (e.g., using predetermined logic or templates), based on statistical or modeled information (e.g., for a plurality of queries, based on probabilities using a model, based on neural networks), or a combination thereof. For example, POS module 301 may, for each word of a string of text, determine the case (e.g., lower case, upper case, first letter capitalized), or it may identify adjacent or included punctuation (e.g., apostrophes, hyphens, accents, commas, slashes, plus signs "+" or star signs "*"), numbers (e.g., spelled out or as digits, or alphanumeric combinations), index position (e.g., first word, second word, last word), possible parts of speech (e.g., a word may be capable of being a noun, verb, adjective, etc.), any other attribute of a word, or any combination thereof.

Articles tagging module 302 is configured to identify articles in a string of text, to further parse the text. Article tagging module 302 identifies articles or determiners such as "a," "the," "some," "every," and "no," determines whether each word has an associated article or determiner, and identifies the word or group of words that is rendered specific or unspecific based on the article. For example, the text "a playlist" is unspecific, while the text "the top playlist" is specific or at least more specific. In some embodiments, articles tagging module 302 and POS module 301 are combined as a single module.

Influential features tagging module 303 is configured to identify words or phrases that more explicitly refer to a dynamic type. In some embodiments, influential features tagging module 303 detects phrases that match, exactly or closely, dynamic types in the query. For example, words such as "playlist," "station," "channel," "season" may be identified by influential features tagging module 303. In an illustrative example, the word "season" may be a recognized influential feature for the dynamic type "episodic program."

Sequence labeling module 304 is configured to label, tag, or otherwise identify patterns of the string of text. In some embodiments, sequence labeling module 304 further parses the string of text to generate labeled sequences. In some embodiments, sequence labeling module 304 uses parts of speech determined by POS module 301 to assign labels. In some embodiments, POS module 301 and sequence labeling module 304 are a single module, configured to identify parts of speech based on analysis of the text string. For example, sequence labeling module 304 may both identify parts of speech or probable parts of speech and use the structure of the text to determine the most likely intended query. In some embodiments, articles tagging module 302, POS tagging module 301, and sequence labeling module 304 are a single module configured to identify articles and parts of speech based on pattern recognition. In an illustrative example, modules 301-304 may be combined into a single module. The module may determine parts of speech, attributes thereof, articles thereof, and any influential features to generate sequence labels. In some embodiments, sequence labeling module 304 determines groups or sequences of words that are related or otherwise collectively refer to an entity (e.g., "Top 10 songs"). In some embodiments, sequence labelling module 304 compares sequences to reference sequences.

Predictor 305 is configured to predict a dynamic type based on the sequence and reference model 320. For example, reference model 320 may include a CRF model, a Markov model, any other suitable model, or any combination thereof. In some embodiments, reference model 320 may be trained using a plurality of training data (e.g., previous or well-characterized queries or text strings). Predictor 305 determines dynamic types based on predetermined models. In some embodiments, predictor 305 generates a plurality of dynamic types based on matching the labeled sequence, each having a respective confidence level.

Selector 306 is configured to select one or more dynamic types generated by predictor 305. In some embodiments, predictor 305 and selector 306 may be combined as a single module. In some embodiments, selector 306 may identify a dynamic type having the highest confidence level. In some embodiments, selector 306 may identify a set of dynamic types having respective confidence levels above a threshold. In some embodiments, selector 306 may sort a set of dynamic types by confidence levels, and select the top N dynamic types (e.g., where N is a positive integer less than the total number of identified dynamic types).

Tag generator 307 is configured to generate tags 308 based on the dynamic types selected by selector 306. Tags 308 do not necessarily correspond to identified entities of the text (e.g., and would not necessarily be identified by an entity recognizer). In some embodiments, each generated tag is indicative of a dynamic type. To illustrate, tags 308 may be included in tags 225 of FIG. 2, as generated by dynamic types identifier 222 of FIG. 2.

Any of the illustrative systems, components, and processes described in the context of FIGS. 1-3 may be implemented using any suitable hardware, devices, software, or combination thereof. For example, the systems and devices of FIGS. 4-5 may be used to implement a conversation system, speech processing system, search engine, any other suitable system, component, or engine, or any combination thereof. For example, a user may access content, an application (e.g., for interpreting a voice query), and other features from one or more of their devices (i.e., user equipment or audio equipment), one or more network-connected devices, one or more electronic devices having a display, or a combination thereof. Any of the illustrative techniques of the present disclosure may be implemented by a user device, a device providing a display to a user, or any other suitable control circuitry configured to respond to a voice query and generate for display content to a user.

Figure 4:
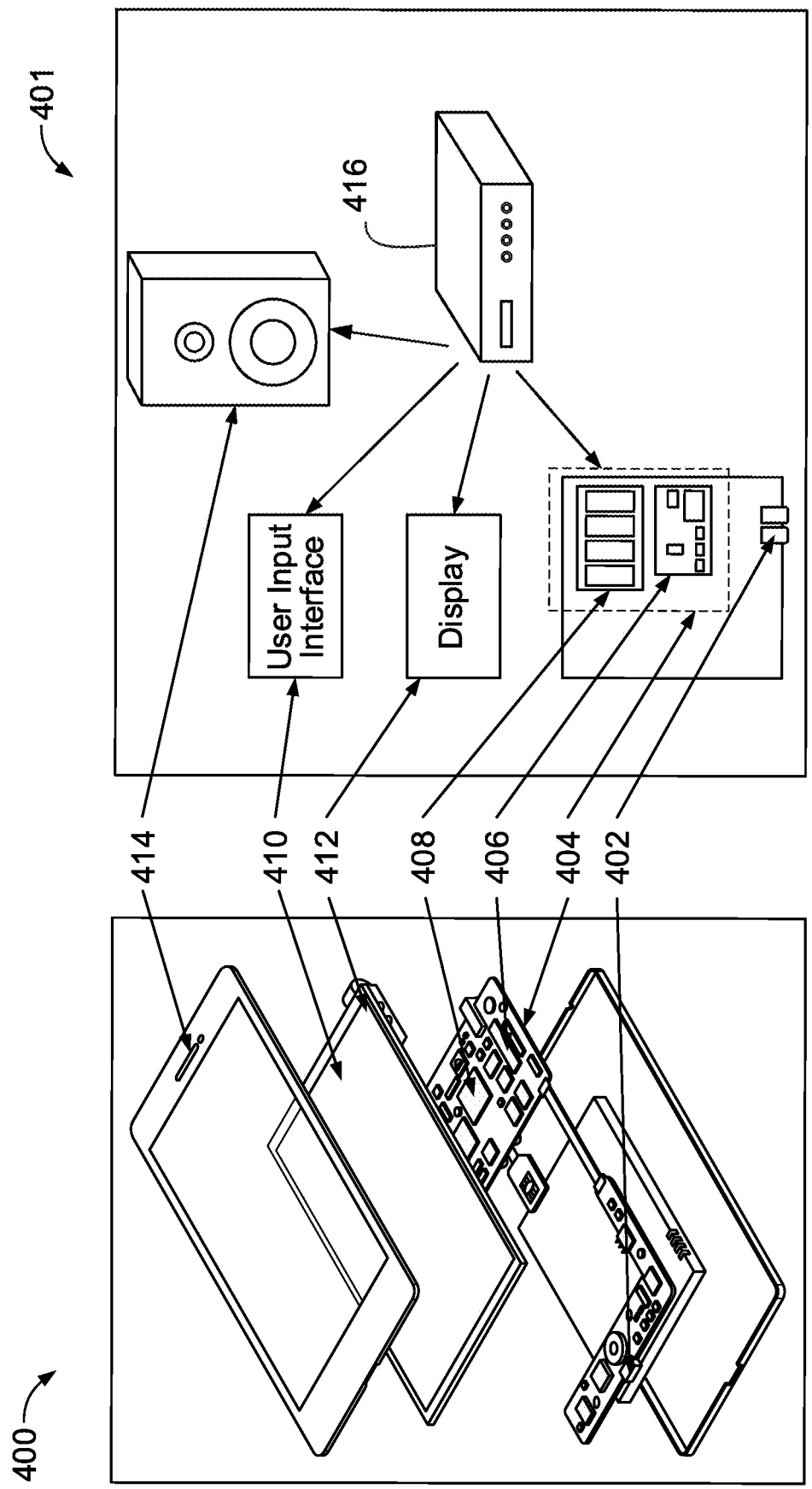
FIG. 4 is a block diagram of an illustrative user device, in accordance with some embodiments of the present disclosure.

FIG. 4 shows generalized embodiments of an illustrative user device. User equipment system 401 may include set-top box 416 that includes, or is communicatively coupled to, display 412, audio equipment 414, and user input interface

410. In some embodiments, display 412 may include a television display or a computer display. In some embodiments, user input interface 410 is a remote-control device. Set-top box 416 may include one or more circuit boards. In some embodiments, the one or more circuit boards include processing circuitry, control circuitry, and storage (e.g., RAM, ROM, hard disk, removable disk, etc.). In some embodiments, circuit boards include an input/output path. Each one of user device 400 and user equipment system 401 may receive content and data via input/output (hereinafter "I/O") path 402. I/O path 402 may provide content and data to control circuitry 404, which includes processing circuitry 406 and storage 408. Control circuitry 404 may be used to send and receive commands, requests, and other suitable data using I/O path 402. I/O path 402 may connect control circuitry 404 (and specifically processing circuitry 406) to one or more communications paths (described below). I/O functions may be provided by one or more of these communications paths but are shown as a single path in FIG. 4 to avoid overcomplicating the drawing. While set-top box 416 is shown in FIG. 4 for illustration, any suitable computing device having processing circuitry, control circuitry, and storage may be used in accordance with the present disclosure. For example, set-top box 416 may be replaced by, or complemented by, a personal computer (e.g., a notebook, a laptop, a desktop), a network-based server hosting a user-accessible client device, a non-user-owned device, any other suitable device, or any combination thereof.

Control circuitry 404 may be based on any suitable processing circuitry such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry is distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for an application stored in memory (e.g., storage 408). Specifically, control circuitry 404 may be instructed by the application to perform the functions discussed above and below. For example, the application may provide instructions to control circuitry 404 to generate the media guidance displays. In some implementations, any action performed by control circuitry 404 may be based on instructions received from the application.

In some client/server-based embodiments, control circuitry 404 includes communications circuitry suitable for communicating with an application server or other networks or servers. The instructions for carrying out the above-mentioned functionality may be stored on the application server. Communications circuitry may include a cable modem, an integrated-services digital network (ISDN) modem, a digital subscriber line (DSL) modem, a telephone modem, an ethernet card, or a wireless modem for communications with other equipment, or any other suitable communications circuitry. Such communications may involve the Internet or any other suitable communications networks or paths. In addition, communications circuitry may include circuitry that enables peer-to-peer communication of user equipment devices, or communication of user equipment devices in locations remote from each other (described in more detail below).

Memory may be an electronic storage device such as storage 408 that is part of control circuitry 404. As referred to herein, the phrase "electronic storage device" or "storage device" should be understood to mean any device for storing electronic data, computer software, or firmware, such as random-access memory, read-only memory, hard drives, optical drives, solid state devices, quantum storage devices, gaming consoles, gaming media, any other suitable fixed or removable storage devices, and/or any combination of the same. Storage 408 may be used to store various types of content described herein as well as media guidance data described above. Nonvolatile memory may also be used (e.g., to launch a boot-up routine and other instructions). Cloud-based storage, for example, may be used to supplement storage 408 or instead of storage 408.

A user may send instructions to control circuitry 404 using user input interface 410. User input interface 410, display 412, or both may include a touchscreen configured to provide a display and receive haptic input. For example, the touchscreen may be configured to receive haptic input from a finger, a stylus, or both. In some embodiments, user device 400 may include a front-facing screen and a rear-facing screen, multiple front screens, or multiple angled screens. In some embodiments, user input interface 410 includes a remote-control device having one or more microphones, buttons, keypads, any other components configured to receive user input, or combinations thereof. For example, user input interface 410 may include a handheld remote-control device having an alphanumeric keypad and option buttons. In a further example, user input interface 410 may include a handheld remote-control device having a microphone and control circuitry configured to receive and identify voice commands and transmit information to set-top box 416.

Audio equipment 414 may be provided as integrated with other elements of each one of user device 400 and user equipment system 401 or may be stand-alone units. The audio component of videos and other content displayed on display 412 may be played through speakers of audio equipment 414. In some embodiments, the audio may be distributed to a receiver (not shown), which processes and outputs the audio via speakers of audio equipment 414. In some embodiments, for example, control circuitry 404 is configured to provide audio cues to a user, or other audio feedback to a user, using speakers of audio equipment 414. Audio equipment 414 may include a microphone configured to receive audio input such as voice commands and speech (e.g., including voice queries). For example, a user may speak letters or words that are received by the microphone and converted to text by control circuitry 404. In a further example, a user may voice commands that are received by the microphone and recognized by control circuitry 404.

An application (e.g., for managing voice queries) may be implemented using any suitable architecture. For example, a stand-alone application may be wholly implemented on each one of user device 400 and user equipment system 401. In some such embodiments, instructions for the application are stored locally (e.g., in storage 408), and data for use by the application is downloaded on a periodic basis (e.g., from an out-of-band feed, from an Internet resource, or using another suitable approach). Control circuitry 404 may retrieve instructions for the application from storage 408 and process the instructions to generate any of the displays discussed herein. Based on the processed instructions, control circuitry 404 may determine what action to perform when input is received from input interface 410. For example, movement of a cursor on a display up/down may be indicated by the processed instructions when input interface 410 indicates that an up/down button was selected. An application and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media card, register memory, processor cache, Random Access Memory (RAM), etc.

In some embodiments, the application is a client/server-based application. Data for use by a thick or thin client implemented on each one of user device 400 and user equipment system 401 is retrieved on demand by issuing requests to a server remote from each one of user device 400 and user equipment system 401. For example, the remote server may store the instructions for the application in a storage device. The remote server may process the stored instructions using circuitry (e.g., control circuitry 404) and generate the displays discussed above and below. The client device may receive the displays generated by the remote server and may display the content of the displays locally on user device 400. This way, the processing of the instructions is performed remotely by the server while the resulting displays, which may include text, a keyboard, or other visuals, are provided locally on user device 400. User device 400 may receive inputs from the user via input interface 410 and transmit those inputs to the remote server for processing and generating the corresponding displays. For example, user device 400 may transmit a communication to the remote server indicating that an up/down button was selected via input interface 410. The remote server may process instructions in accordance with that input and generate a display of the application corresponding to the input (e.g., a display that moves a cursor up/down). The generated display is then transmitted to user device 400 for presentation to the user.

In some embodiments, the application is downloaded and interpreted or otherwise run by an interpreter or virtual machine (e.g., run by control circuitry 404). In some embodiments, the application may be encoded in the ETV Binary Interchange Format (EBIF), received by control circuitry 404 as part of a suitable feed, and interpreted by a user agent running on control circuitry 404. For example, the application may be an EBIF application. In some embodiments, the application may be defined by a series of JAVA-based files that are received and run by a local virtual machine or other suitable middleware executed by control circuitry 404.

Figure 5:
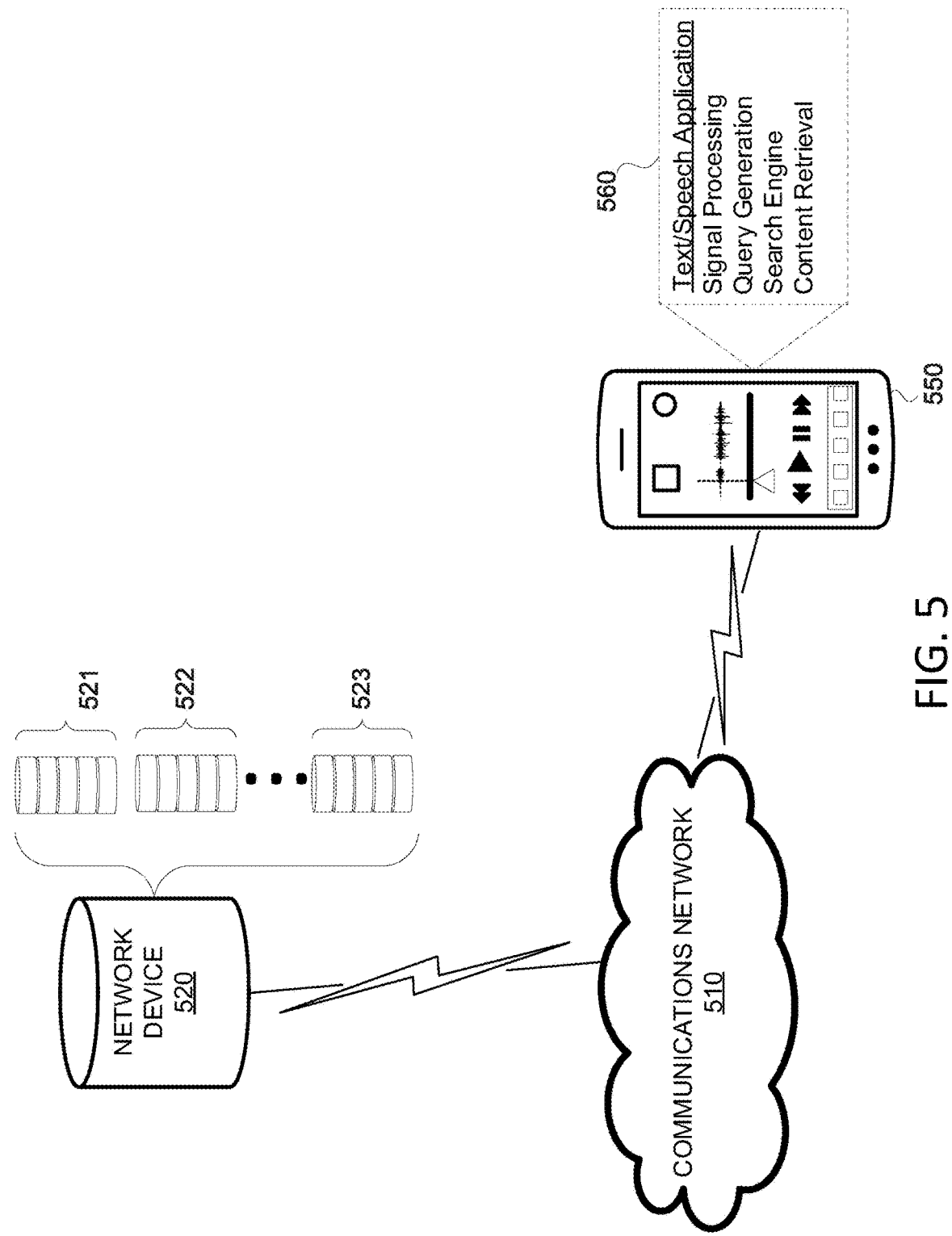
FIG. 5 shows a block diagram of an illustrative system for responding to a voice query, in accordance with some embodiments of the present disclosure.

FIG. 5 shows a block diagram of illustrative network arrangement 500 for responding to a voice query, in accordance with some embodiments of the present disclosure. Illustrative system 500 may be representative of circumstances in which a user provides a voice query at user device 550, views content on a display of user device 550, or both. In system 500, there may be more than one type of user device, but only one is shown in FIG. 5 to avoid overcomplicating the drawing. In addition, each user may utilize more than one type of user device and also more than one of each type of user device. User device 550 may be the same as user device 400 of FIG. 4, user equipment system 401, any other suitable device, or any combination thereof.

User device 550, illustrated as a wireless-enabled device, may be coupled to communications network 510 (e.g., connected to the Internet). For example, user device 550 is coupled to communications network 510 via a communications path (e.g., which may include an access point). In some embodiments, user device 550 may be a computing device coupled to communications network 510 via a wired connection. For example, user device 550 may also include wired connections to a LAN, or any other suitable communications link to network 510. Communications network 510 may be one or more networks including the Internet, a mobile phone network, mobile voice or data network (e.g., a 4G or LTE network), cable network, public switched telephone network, or other types of communications network or combinations of communications networks. Communications paths may include one or more communications paths, such as a satellite path, a fiber-optic path, a cable path, a path that supports Internet communications, free-space connections (e.g., for broadcast or other wireless signals), or any other suitable wired or wireless communications path or combination of such paths. Although communications paths are not drawn between user device 550 and network device 520, these devices may communicate directly with each other via communications paths, such as those described above, as well as other short-range point-to-point communications paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. Devices may also communicate with each other directly through an indirect path via communications network 510.

System 500, as illustrated, includes network device 520 (e.g., a server or other suitable computing device) coupled to communications network 510 via a suitable communications path. Communications between network device 520 and user device 550 may be exchanged over one or more communications paths but are shown as a single path in FIG. 5 to avoid overcomplicating the drawing. Network device 520 may include a database, one or more applications (e.g., as an application server, host server). A plurality of network entities may exist and be in communication with network 510, but only one is shown in FIG. 5 to avoid overcomplicating the drawing. In some embodiments, network device 520 may include one source device. In some embodiments, network device 520 implements an application that communicates with instances of applications at many user devices (e.g., user device 550). For example, an instance of a social media application may be implemented on user device 550, with application information being communicated to and from network device 520, which may store profile information for the user (e.g., so that a current social media feed is available on other devices than user device 550). In a further example, an instance of a search application may be implemented on user device 550, with application information being communication to and from network device 520, which may store profile information for the user, search histories from a plurality of users, entity information (e.g., content and metadata), any other suitable information, or any combination thereof.

In some embodiments, network device 520 includes one or more types of stored information, including, for example, entity information, metadata, content, historical communications and search records, user preferences, user profile information, any other suitable information, or any combination thereof. Network device 520 may include an applications-hosting database or server, plug-ins, a software developers kit (SDK), an applications programming interface (API), or other software tools configured to provide software (e.g., as downloaded to a user device), run software remotely (e.g., hosting applications accessed by user devices), or otherwise provide applications support to applications of user device 550. In some embodiments, information from network device 520 is provided to user device 550 using a client/server approach. For example, user device 550 may pull information from a server, or a server may push information to user device 550. In some embodiments, an application client residing on user device 550 may initiate sessions with network device 520 to obtain information when needed (e.g., when data is out-of-date or when a user device receives a request from the user to receive data). In some embodiments, information may include user information (e.g., user profile information, user-created content). For example, the user information may include current and/or historical user activity information such as what content transactions the user engages in, searches the user has performed, content the user has consumed, whether the user interacts with a social network, any other suitable information, or any combination thereof. In some embodiments, the user information may identify patterns of a given user for a period of time. As illustrated, network device 520 includes entity information for a plurality of entities. Entity information 521, 522, and 523 include metadata for the respective entities. Entities for which metadata is stored in network device 520 may be linked to each other, may be referenced to each other, may be described by one or more tags in metadata, or a combination thereof.

In some embodiments, an application may be implemented on user device 550, network device 520, or both. For example, the application may be implemented as software or a set of executable instructions, which may be stored in storage of the user device 550, network device 520, or both and executed by control circuitry of the respective devices. In some embodiments, an application may include an audio recording application, a speech-to-text application, a text-to-speech application, a voice-recognition application, or a combination thereof, that is implemented as a client/server-based application, where only a client application resides on user device 550, and a server application resides on a remote server (e.g., network device 520). For example, an application may be implemented partially as a client application on user device 550 (e.g., by control circuitry of user device 550) and partially on a remote server as a server application running on control circuitry of the remote server (e.g., control circuitry of network device 520). When executed by control circuitry of the remote server, the application may instruct the control circuitry to generate a display and transmit the generated display to user device 550. The server application may instruct the control circuitry of the remote device to transmit data for storage on user device 550. The client application may instruct control circuitry of the receiving user device to generate the application displays.

In some embodiments, the arrangement of system 500 is a cloud-based arrangement. The cloud provides access to services, such as information storage, searching, messaging, or social networking services, among other examples, as well as access to any content described above, for user devices. Services can be provided in the cloud through cloud-computing service providers, or through other providers of online services. For example, the cloud-based services can include a storage service, a sharing site, a social networking site, a search engine, or other services via which user-sourced content is distributed for viewing by others on connected devices. These cloud-based services may allow a user device to store information to the cloud and to receive information from the cloud rather than storing information locally and accessing locally stored information. Cloud resources may be accessed by a user device using, for example, a web browser, a messaging application, a social media application, a desktop application, or a mobile application, and may include an audio recording application, a speech-to-text application, a text-to-speech application, a voice-recognition application and/or any combination of access applications of the same. User device 550 may be a cloud client that relies on cloud computing for application delivery, or user device 550 may have some functionality without access to cloud resources. For example, some applications running on user device 550 may be cloud applications (e.g., applications delivered as a service over the Internet), while other applications may be stored and run on user device 550. In some embodiments, user device 550 may receive information from multiple cloud resources simultaneously.

In an illustrative example, a user may speak a voice query to user device 550. The voice query is recorded by an audio interface of user device 550, sampled and digitized by application 560, and converted to a text query by application 560. Application 560 may then identify entities of the text query, identify one or more dynamic types of the text query, and generate resultant tags. Application 560 then uses the dynamic tags to generate a query interpretation and use the interpretation to perform a search or communicate the interpretation to network device 520 to perform the search. Network device 520 may identify an entity associated with the query interpretation, content associated with the query interpretation, or both and provide that information to user device 550.

Application 560 may include any suitable functionality such as, for example, audio recording, speech recognition, speech-to-text conversion, text-to-speech conversion, query generation, dynamic types identification, search engine functionality, content retrieval, display generation, content presentation, metadata generation, database functionality, or a combination thereof. In some embodiments, aspects of application 560 are implemented across more than one device. In some embodiments, application 560 is implemented on a single device. For example, entity information 521, 522, and 523 may be stored in memory storage of user device 550, and may be accessed by application 560.

Figure 6:
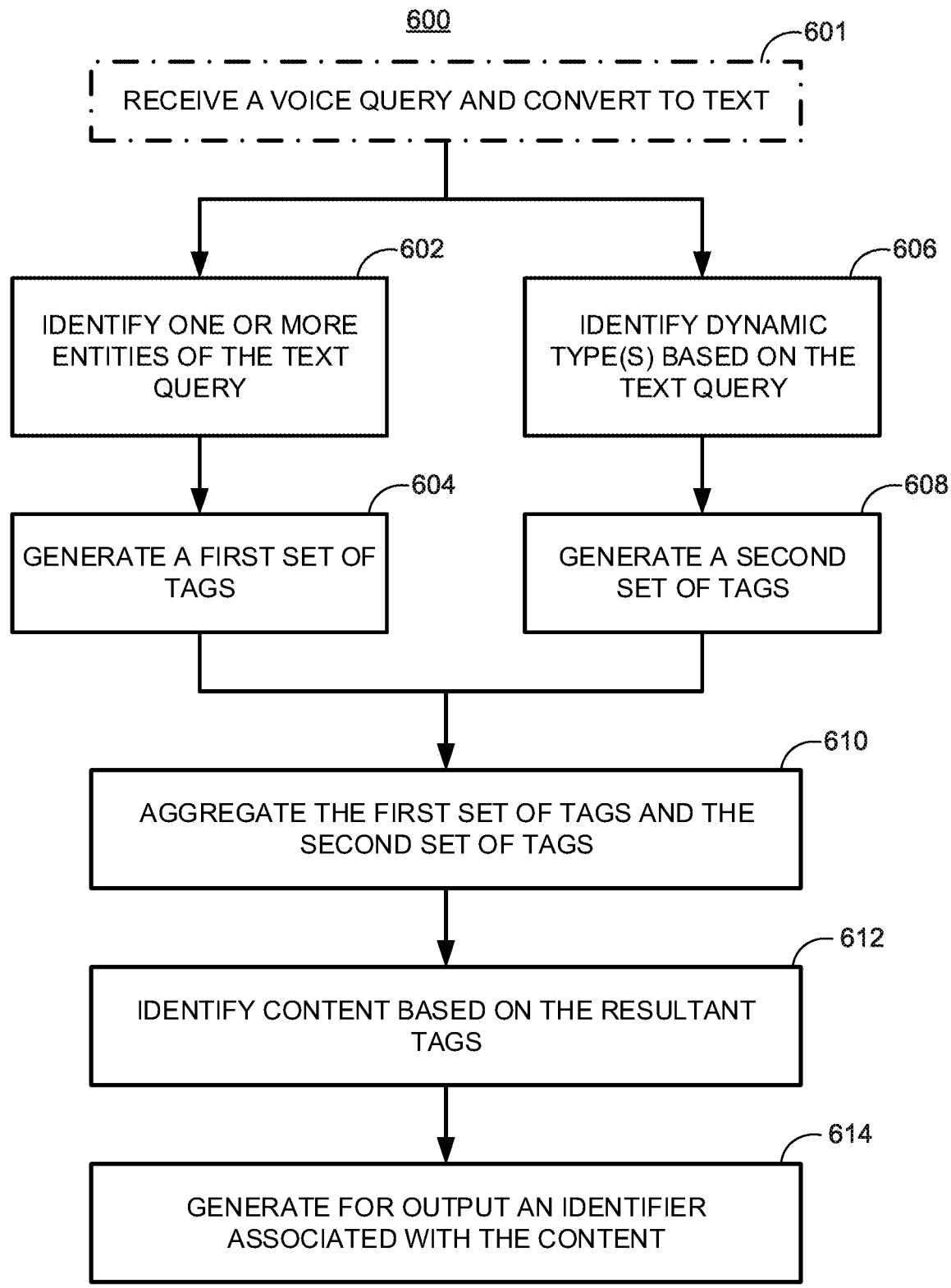
FIG. 6 shows a flowchart of an illustrative process for responding to a voice query, in accordance with some embodiments of the present disclosure.

FIG. 6 shows a flowchart of illustrative process 600 for responding to a voice query based on pronunciation information, in accordance with some embodiments of the present disclosure. For example, a query application may perform process 600, implemented on any suitable hardware such as user device 400 of FIG. 4, user equipment system 401 of FIG. 4, user device 550 of FIG. 5, network device 520 of FIG. 5, any other suitable device, or any combination thereof. In a further example, the query application may be an instance of application 560 of FIG. 5. FIG. 7 shows further illustrative steps 651-654 of process 606 of FIG. 6 for generating tags based on a dynamic type, in accordance with some embodiments of the present disclosure.

At step 601, the query application receives a voice query. In some embodiments, an audio interface (e.g., audio equipment 414, user input interface 410, or a combination thereof) may include a microphone or other sensor that receives audio input and generates an electronic signal. In some embodiments, the audio input is received at an analog sensor, which provides an analog signal that is conditioned, sampled, and digitized to generate an audio file. In some embodiments, the audio file is stored in memory (e.g., storage 408). In some embodiments, the query application includes a user interface (e.g., user input interface 410), which allows a user to record, play back, alter, crop, visualize, or otherwise manage audio recording. For example, in some embodiments, the audio interface is always configured to receive audio input. In a further example, in some embodiments, the audio interface is configured to receive audio input when a user provides an indication to a user input interface (e.g., by selecting a soft button on a touchscreen to begin audio recording). In a further example, in some embodiments, the audio interface is configured to receive audio input and begins recording when speech or other suitable audio signals are detected. The query application may include any suitable conditioning software or hardware for converting audio input to a stored audio file. For example, the query application may apply one or more filters (e.g., low-pass, high-pass, notch filters, or band-pass filters), amplifiers, decimators, or other conditionings to generate the audio file. In a further example, the query application may apply any suitable processing to a conditioned signal to generate an audio file such as compression, transformation (e.g., spectral transformation, wavelet transformation), normalization, equalization, truncation (e.g., in a time or spectral domain), any other suitable processing, or any combination thereof. In some embodiments, at step 601, the control circuitry receives an audio file from a separate application, a separate module of the query application, based on a user input, or any combination thereof. For example, at step 601, the control circuitry may receive a voice query as an audio file stored in storage (e.g., storage 408), for further processing (e.g., steps 604-612 of process 600). In some embodiments, step 601 need not be performed, and process 600 includes analyzing an existing text query (e.g., stored in memory, or converted to text by a separate application).

In some embodiments, the query application may store snippets (i.e., clips of short duration) of recorded audio during detected speech, and process the snippets. In some embodiments, the query application stores relatively large segments of speech (e.g., more than 10 seconds) as an audio file, and processes the file. In some embodiments, the query application may process speech to detect words by using a continuous computation. For example, a wavelet transform may be performed on speech in real time, providing a continuous, if slightly time-lagged, computation of speech patterns (e.g., which could be compared to a reference to identify words). In some embodiments, the query application may detect words, as well as which user uttered the words (e.g., voice recognition), in accordance with the present disclosure.

At step 602, the query application identifies one or more entities of a text query (e.g., the text query generated at step 601). In some embodiments, the query application identifies keywords associated with entities such as, for example, words, phrases, names, places, channels, media asset titles, or other keywords, using any suitable criteria to identify keywords from an audio input. The query application may process words using any suitable word detection technique, speech detection technique, pattern recognition technique, signal processing technique, or any combination thereof. For example, the query application may compare a series of signal templates to a portion of an audio signal to find whether a match exists (e.g., whether a particular word is included in the audio signal). In a further example, the query application may apply a learning technique to better recognize words in voice queries. For example, the query application may gather feedback from a user on a plurality of requested content items in the context of a plurality of queries, and accordingly use past data as a training set for making recommendations and retrieving content. In some embodiments, the query application may identify one or more static types based on the text query.

In some embodiments, at step 602, the query application adds detected words to a list of words detected in the query. In some embodiments, the query application may store these detected words in memory. For example, the query application may store in memory words as a collection of ASCII characters (i.e., 8-bit code), a pattern (e.g., indicating a speech signal reference used to match the word), an identifier (e.g., a code for a word), a string, any other datatype, or any combination thereof. In some embodiments, the media guidance application may add words to memory as they are detected. For example, the media guidance application may append a string of previously detected words with a newly detected word, add a newly detected word to a cell array of previously detect words (e.g., increase the cell array size by one), create a new variable corresponding to the newly detected word, create a new file corresponding to the newly created word, or otherwise store one or more words detected at step 602.

In some embodiments, at step 602, the query application compares text of the text query to a database that includes entity information (e.g., database 170 of FIG. 1, or entity information 250 of FIG. 2). For example, the database may include stored information associated with a plurality of entities, associated metadata, and other suitable information for linking entities. The query application may output a list of entities mapped to each word or phrase of the text query. In an illustrative example, the output of step 602 may include a Cartesian product of identified entities or a reduced set of identified entities (e.g., shortlisting entities). In a further illustrative example, the query application may identify entities that overlap more than one phrase, and preferentially select those entities over entities that do not.

In some embodiments, the query application identifies the entity based on user profile information. For example, the query application may identify the entity based on a previously identified entity from a previous voice query. In a further example, the query application may identify the entity based on popularity information associated with the entity (e.g., based on searches for a plurality of users). In some embodiments, the query application identifies the entity based on a user's preferences. For example, if one or more keywords match a preferred entity name or identifier of the user profile information, then the query application may identify that entity or more heavily weigh that entity.

In some embodiments, the query application identifies the entity by identifying the plurality of entities (e.g., with metadata stored for each entity), determining a respective score for each respective entity of the plurality of entities based on comparing the respective pronunciation tag with the text query, and selecting the entity by determining a maximum score. The score may be based on how many matches are identified between keywords of the text query and metadata associated with the entity or content item.

In some embodiments, the query application identifies more than one entity (e.g., and associated metadata) among the plurality of entities based on the text query. The query application may identify a content item that is associated with some or all of the entities of the query. In some embodiments, the query application identifies the entity by comparing at least a portion of the text query to tags of the stored metadata for each entity to identify a match.

In an illustrative example, the query application may compare words or phrases of the text query to nodes of an information graph (e.g., storing information and relationships among a large plurality of entities). For a query "movies of Tom Cruise," the query application identifies the words "movies" "Tom" and "Cruise." The query application may identify matches for each word among nodes of the information graph. Nodes for which more than one word or phrase matches are weighted more heavily, or otherwise selected as the identified entity. For the above query, the list of nodes matching "Tom" and "Cruise" overlap at entity "Tom Cruise," which is associated with entity "actor," for example.

At step 604, the query application generates a first set of tags based on the identified entities of step 602. In some embodiments, each word of the text query is assigned one or more tags that may correspond to respective entities. In some embodiments, the first set of tags is ordered by entity type, placement in the query, confidence in identification, or other criteria. In some embodiments, the first set of tags is generated without reference to the text query. For example, the first set of tags may include tags for identified entities from the information graph, without regard to order in the query. In an illustrative example, each word or phrase of the query may have a respective plurality of associated tags, with the first set of tags being the Cartesian product of the respective pluralities. In some embodiments, the query application may generate one or more tags corresponding to static types identified in the text query.

In some embodiments, the query application may perform steps 602 and 604 as a single step. For example, steps 602 and 604 may be combined (e.g., performed by entity identifier 221 of FIG. 2).

At step 606, the query application identifies one or more dynamic types based on the text query (e.g., the text query of step 601). In some embodiments, the query application applies any of the techniques described in the context of system 300 of FIG. 3. For example, system 300 may be used to implement step 606. FIG. 7 includes further steps 651-654, any or all of which may be performed at step 606.

In some embodiments, at step 651, the query application identifies one or more words of the query, and then identifies the one or more dynamic categorizations based on comparing the one or more words of the text query to the tags associated with the one or more dynamic categorizations. In some embodiments, the one or more dynamic categorizations are associated with tags.

In some embodiments, at step 652 of FIG. 7, the query application identifies a sequence of words of the query that correspond to a predetermined sequence of words, and then identifies the one or more dynamic categorizations based on the predetermined sequence of words. For example, a sequence of words such as "top 10" or "viral 50" may be identified as matching tags of the dynamic categorization "playlist." The predetermined sequence of words may be stored as part of reference information (e.g., reference information 150 of FIG. 1). A sequence of words may include one or more words, which may be, but need not be, consecutive.

In some embodiments, at step 653 of FIG. 7, the query application identifies parts of speech of the text query, and then identifies the one or more dynamic categorizations based on comparing a sequence of parts of speech to one or more predetermined sequences associated with the one or more dynamic categorizations. In some embodiments, the query application identifies one or more sequences of the parts of speech. For example, the query application may identify "verb" "article" "adjective" "digit" as individual parts of speech, and also may identify "verb-article-adjective-digit" or "verb" "article-adjective-digit" as sequences of the parts of speech.

In some embodiments, at step 654 of FIG. 7, the query application applies probability analysis to the query or aspects derived thereof to identify a dynamic categorization. In some embodiments, the query application applies, for example, a conditional random field (CRF) model, a Hidden Markov model (HMM), a Viterbi algorithm, any other suitable sequence tagging model (e.g., discrete or conditional), any other suitable model of any suitable type, or any combination thereof to identify dynamic types. For example, the query application may use probabilities or confidences, stored in reference information (e.g., reference information 150 of FIG. 1) mapped to features, to determine one or more dynamic types. To illustrate, for a query "play the top 10" the query application may identify parts of speech "verb-article-determiner-digit" (e.g., at step 653), which may have an associated probability (e.g., the probability may be 0.60 or any other suitable value) of being associated with the playlist. The query application may return all dynamic types that are identified, only those having a probability above a threshold, only those corresponding to multiple features of the query (e.g., corresponding to multiple parts of speech, sequences, and influential features), or any other set of dynamic types. For example, if the dynamic type "station" is identified based on several sequences of parts of speech, the query application may identify "station" as the dynamic type.

In an illustrative example, the query application may identify a plurality of phrases of the text query and a plurality of corresponding dynamic types. For each dynamic categorization, the query application may determine a respective score based on a comparison of the plurality of phrases (e.g., sequence of words or parts of speech) with tags of the dynamic categorization. In some such embodiments, the query application identifies the one or more dynamic categorizations based on the one or more respective scores. The scores may include the probabilities of each dynamic type as stored in reference information (e.g., the score may equal the probability or confidence of the type, weighted in any suitable way). For example, the query application may select the dynamic categorizations having scores above a threshold, a predetermined number of dynamic categorizations from a list of dynamic categorizations sorted by score, all of the dynamic categorizations, none of the dynamic categorizations (e.g., if no dynamic categorizations are identified, or those identified do not meet predetermined criteria), or any other suitable set of dynamic categorizations.

At step 608, the query application generates a second set of tags based on the one or more dynamic types identified at step 606. In some embodiments, the text query is assigned one or more tags that may correspond to identified dynamic categorizations. In some embodiments, the second set of tags is ordered by confidence value, or other criteria. In some embodiments, the second set of tags is generated as a set without an order or ranking. In an illustrative example, each feature of the query may have a respective plurality of associated tags, with the second set of tags being the Cartesian product of the respective pluralities.

In some embodiments, the query application may perform steps 606 and 608 as a single step. For example, steps 606 and 608 may be combined (e.g., performed by dynamic types identifier 222 of FIG. 2).

At step 610, the query application aggregates the first set of tags of step 604 and the second set of tags of step 608 to generate a set of resultant tags. In some embodiments, the resultant tags include a union of the first set of tags and the second set of tags. In some embodiments, the resultant tags are the Cartesian product of the first and second sets of tags of steps 604 and 608, respectively. The query application may store the resultant tags in any suitable data structure, having any suitable format, in storage of any suitable device or combination of devices. The resultant tags may include tags corresponding to entities (e.g., from steps 602 and 604), static types (e.g., from steps 602 and 604), dynamic types (e.g., from steps 606 and 608), any other suitable tags, or any combination thereof.

At step 612, the query application identifies content based on the resultant tags. In some embodiments, step 612 includes generating query interpretations based on the resultant tags, analyzing the query interpretations using reference templates, selecting among the reference templates, identifying a content source, and identifying the content from the content source. In some embodiments, the query application performs process 800 of FIG. 8 as part of step 612.

FIG. 8 shows a flowchart of illustrative process 800 for generating a resulting query, in accordance with some embodiments of the present disclosure. For example, a query application may perform process 800, implemented on any suitable hardware such as user device 400 of FIG. 4, user equipment system 401 of FIG. 4, user device 550 of FIG. 5, network device 520 of FIG. 5, any other suitable device, or any combination thereof. In a further example, the query application may be an instance of application 560 of FIG. 5. In some embodiments, the query application performs process 800 as part of step 612 of process 600. For example, the query application may generate the resultant query of process 800 as part of identifying and retrieving content at step 612.

In some embodiments, at step 802, the query application generates query interpretations based on the resultant tags. For example, if the tags include "media," "playlist," and "Tom Cruise," then one query interpretation may be "play Tom Cruise movies," while another query interpretation may be "play songs having the title Tom Cruise." In some embodiments, the query application may generate a plurality of query interpretations. In some embodiments, the query application retrieves the query interpretation templates from reference information (e.g., reference information 150 of FIG. 1), by inputting the set of resultant tags. In some embodiments, each tag may have an associated probability of corresponding to a query interpretation. In some embodiments, each query interpretation may have a set of probabilities as being associated with one or more tags, and the query application may determine a score based on a composite score of the probabilities. For example, the query application may select only those query interpretations that have a probability above a threshold, or match a predetermined number of tags with a predetermined probability.

In some embodiments, at step 804, the query application identifies and retrieves a set of reference templates (e.g., from reference information 150 of FIG. 1) to compare with query interpretations to generate a short list, select a query interpretation or template, or a combination thereof. For example, there may exist a large number of query interpretations, and comparison with reference templates allows the query application to parse and filter the interpretations. The reference templates may include a set or a sequence of entities, which may be compared against the query interpretations.

In an illustrative example, the query application may generate a plurality of query interpretations that include "movies of Tom Cruise," "movies of person," "media of Tom Cruise," and "media of person." A particular reference template may match all four of these interpretations, and the query application may apply a decision engine to select one or more of these interpretations. For example, the query application may select "movies of Tom Cruise" for inclusion in the short list of interpretations.

In some embodiments, at step 806, the query application generates a set of query interpretations based on matching with reference templates. In some embodiments, the query application may determine a content source based on the set of query interpretations. For example, if the set of interpretations include entities associated with music, the query application may identify a content source for music-based media content items.

In some embodiments, at step 808, the query application generates a resultant query based on the resultant tags of step 610 and one or more query interpretations. In some embodiments, the resultant query is a query interpretation that most closely matches a reference template, matches at least a predetermined number of reference templates, or both. In some embodiments, the query application provides the resultant query to a content source to retrieve a media content item. Databases that are arranged by entity, content, or both may be searched by the query application. In some embodiments, the query application provides the resultant query to a search engine, which is configured to search for and retrieve relevant content, links thereto, or content identifiers.

At step 614, the query application generates for output an identifier associated with the content. The identifier may include an entity name associated with the content, a link to content, any other suitable identifier, or any combination thereof. In some embodiments, the query application outputs a list of identifiers, each corresponding to a content item, content source, information source, or a combination thereof. In some embodiments, the query application retrieves a content item associated with the query. In some embodiments, the query application identifies a content item, downloads a content item, streams a content item, generates for display a content item, or a combination thereof. For example, a voice query may include "Show me recent Tom Cruise movies" and the query application may provide a link to the movie "Mission Impossible: Fallout," which the user can select to view the video content. In some embodiments, the query application may retrieve a plurality of content that is associated with entities matching the text query. For example, the query application may retrieve a plurality of links, video files, audio files, or other content, or a list of identified content items, in accordance with the present disclosure. In some embodiments, the query application stores one or more content identifiers, the resultant query used, resultant tags, a dynamic type, one or more query interpretations, comparison metrics between the query interpretations and reference templates, or a combination thereof, in user profile information (e.g., user profile information 160 of FIG. 1), reference information (e.g., reference information 150 of FIG. 1), any other suitable database (e.g., one or more databases 170 of FIG. 1), or any combination thereof.

FIG. 9 shows a flowchart of illustrative process 900 for training a system for detecting dynamic types, in accordance with some embodiments of the present disclosure. For example, an application may perform process 900, implemented on any suitable hardware of FIGS. 4-5, any other suitable device, or any combination thereof. In a further example, the application may be implemented at any suitable time, and in response to any suitable trigger (e.g., which need not include a user query or user input). In a further example, the results of process 900 may be used as reference information (e.g., reference information 150 of FIG. 1, reference information 270 of FIG. 2, reference model 320 of FIG. 3, or a combination thereof) for processes 600 and 800 of FIGS. 6 and 8, respectively. In some embodiments, process 900 includes the application inputting one or more queries with known properties to a model framework, and outputting probabilistic metrics corresponding to one or more features of the queries (e.g., hidden features, specified features, or both).

At step 902, the application identifies a query. In some embodiments, at step 902, the query application receives an audio file (e.g., of an utterance) and converts the audio file to a text file using ASR. In some embodiments, at step 902, the application analyzes an existing text query (e.g., stored in memory, or converted to text by a separate application). In some embodiments, the application identifies a plurality of queries in series, parallel, or a combination thereof. For example, a training set of queries may be provided to, or identified by, the application at step 902. The query may include, for example, various parts of speech, one or more entities, words, digits, punctuation, any other components, or any combination thereof. Illustrative examples of queries include "top 50 playlist," "Radiocity station," "tune to Big FM station," and "favorite Justin Timberlake hits." In some embodiments, a broad and varied set of queries are identified and used by the application to provide robust training of the model for the wide variety of potential user queries including non-static types.

At step 904, the application determines phrases and their respective types. In some embodiments, the types are dynamic types. The application receives queries and associated dynamic types as inputs. In some embodiments, each dynamic type may have a plurality of associated phrases. For example, the dynamic type "playlist" may have associated phrases such as "top 50," "new music," and "viral 20." In a further example, the dynamic type "station" may have associated phrases such as "Radiocity," "Big FM," and "MTV." In a further example, the phrase "Tom Cruise" may have more than one type associated such as "person," "actor," "action star," "movie," or a general "cross-type" categorization. The application determines this input information (e.g., the phrases, words and types) for inputting to the model framework at step 906.

At step 906, the application applies a model to generate reference information. For example, based on the "training set" of input of step 904, the application applies the model to determine features and probabilities. The model may include, for example, a conditional random field (CRF) model, a Hidden Markov model (HMM), a Viterbi algorithm, any other suitable sequence tagging model (e.g., discrete or conditional), any other suitable model of any suitable type, or any combination thereof to achieve pattern recognition, prediction, and segmentation. For example, the model may include a plurality of features such "verb-noun-verb" or "'play'-*-digit" against which the inputs are analyzed to determine probabilities that each feature indicates the known type. Any suitable features may be specified (e.g., and for which a probability is determined) including, for example, a POS sequence, articles, influential features, any other suitable features, or any combination thereof.

In an illustrative example, the application may determine that the dynamic type "station" is associated with the sequence "verb-preposition-FM" with a probability of 0.80, and that the dynamic type "playlist" is associated with the sequence "verb-article-noun-digit" with a probability of 0.87. These sequences (e.g., features) and the corresponding probability values are stored in the reference information, along with a plurality of other sequences and their corresponding probabilities. Accordingly, this reference information may be used at step 606 of process 600 to identify dynamic types in non-training queries (e.g., actual user queries) to retrieve content.

At step 908, the application stores the model and the reference information (e.g., in reference information 150 of FIG. 1). The application may store the reference information in any suitable format. For example, the reference information, along with any suitable metadata, may be stored as a data structure, a map, pickled data (e.g., stored as a binary file), text file (e.g., a comma separated value (CSV) file), any other suitable format, or any combination thereof. The application may store the reference information on any suitable memory storage that may be included in a user device (e.g., a smartphone), network device (e.g., a server), a computer, any other computing device, or any combination thereof (e.g., distributed among any suitable number of devices).

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method for identifying content based on a query, the method comprising:
   receiving data that indicates a query;
   identifying, from one or more databases, keywords based on the data and the query;
   determining that a portion of the query cannot be categorized based on the keywords;
   identifying a dynamic categorization associated with the portion of the query by comparing at least one of words, phrases, or parts of speech of the query to tags associated with dynamic categorizations;
   generating search tags based on the keywords and the dynamic categorization;
   determining content items based on the search tags; and
   causing to be outputted the content items.

2. The method of claim 1, wherein the keywords are stored in metadata from the one or more databases, and wherein the dynamic categorization is not stored in the metadata.

3. The method of claim 1, wherein identifying the dynamic categorization comprises:
   determining, based on comparing the at least one of words, phrases, or parts of speech to the tags, a plurality of scores corresponding to the dynamic categorizations, wherein the dynamic categorization is identified based on the plurality of scores.

4. The method of claim 1, wherein the data comprises a user identifier, the method further comprising:
determining a profile based on the user identifier; and
identifying the dynamic categorization based on user information from the profile.

5. The method of claim 1, wherein comparing the at least one of words, phrases, or parts of speech comprises comparing a sequence corresponding to the at least one of words, phrases, or parts of speech.

6. The method of claim 1, wherein:
the query is a voice query; and
the data comprises a speech-to-text transcription of the voice query.

7. The method of claim 1, further comprising:
determining a content item of the content items that is most closely associated with the dynamic categorization;
generating a tag that associates the content item with the dynamic categorization; and
storing the tag.

8. The method of claim 1, further comprising:
identifying an entity associated with a keyword of the keywords; and
generating the search tags based on the entity.

9. The method of claim 1, wherein;
the query is received at a user interface; and
the content identifiers are outputted at a display device associated with the user interface.

10. The method of claim 1, further comprising:
generating a query interpretation based on the search tags, wherein the content items are determined based on the query interpretation.

11. A system for identifying content based on a query, the system comprising:
one or more input/output (I/O) paths for receiving a query; and
control circuitry configured to:
receive, via the one or more I/O paths, data that indicates a query;
identify, from one or more databases, keywords based on the data and the query;
determine that a portion of the query cannot be categorized based on the keywords;
identify a dynamic categorization associated with the portion of the query by comparing at least one of words, phrases, or parts of speech of the query to tags associated with dynamic categorizations;
generate search tags based on the keywords and the dynamic categorization;
determine content items based on the search tags; and
cause to be outputted the content items.

12. The system of claim 11, wherein the keywords are stored in metadata from the one or more databases, and wherein the dynamic categorization is not stored in the metadata.

13. The system of claim 11, wherein the control circuitry, when identifying the dynamic categorization, is configured to:
determine, based on comparing the at least one of words, phrases, or parts of speech to the tags, a plurality of scores corresponding to the dynamic categorizations; and
wherein the control circuitry is further configured to identify the dynamic categorization based on the plurality of scores.

14. The system of claim 11, wherein:
the data comprises a user identifier; and
the control circuitry is further configured to:
determine a profile based on the user identifier; and
identify the dynamic categorization based on user information from the profile.

15. The system of claim 11, wherein the control circuitry, when comparing the at least one of words, phrases, or parts of speech, is configured to compare a sequence corresponding to the at least one of words, phrases, or parts of speech.

16. The system of claim 11, wherein:
the query is a voice query; and
the data comprises a speech-to-text transcription of the voice query.

17. The system of claim 11, wherein the control circuitry is further configured to:
determine a content item of the content items that is most closely associated with the dynamic categorization;
generate a tag that associates the content item with the dynamic categorization; and
store the tag.

18. The system of claim 11, wherein the control circuitry is further configured to:
identify an entity associated with a keyword of the keywords; and
generate the search tags based on the entity.

19. The system of claim 11, wherein:
the query is received at a user interface; and
the control circuitry is further configured to cause the content identifiers to be outputted at a display device associated with the user interface.

20. The system of claim 11, wherein the control circuitry is further configured to:
generate a query interpretation based on the search tags; and
determine the content items based on the query interpretation.

* * * * *